(12) United States Patent
Kim (10) Patent No.: US 7,478,929 B2
(45) Date of Patent: Jan. 20, 2009

(54) BACKLIGHT UNIT

(75) Inventor: Nam Su Kim, Daegu-si (KR)

(73) Assignee: LG. Display Co., Ltd., Seoul (KR)

( * ) Notice: Subject to any disclaimer, the term of this patent is extended or adjusted under 35 U.S.C. 154(b) by 15 days.

(21) Appl. No.: 11/647,113

(22) Filed: Dec. 27, 2006

(65) Prior Publication Data

US 2008/0002403 A1    Jan. 3, 2008

(30) Foreign Application Priority Data

Jun. 30, 2006    (KR) ............... 10-2006-0060529

(51) Int. Cl.
*F21V 7/00* (2006.01)

(52) U.S. Cl. .................. 362/297; 362/97; 362/296; 362/310; 349/67

(58) Field of Classification Search .............. None
See application file for complete search history.

(56) References Cited

U.S. PATENT DOCUMENTS

| 2005/0083713 A1* | 4/2005 | Boks ................. 362/561 |
| 2005/0259195 A1* | 11/2005 | Koganezawa ............ 349/65 |
| 2006/0215075 A1* | 9/2006 | Huang et al. ............ 349/67 |
| 2006/0262564 A1* | 11/2006 | Baba ................. 362/616 |
| 2007/0002565 A1* | 1/2007 | Han et al. ............ 362/240 |
| 2007/0230213 A1* | 10/2007 | Lee et al. ............ 362/606 |
| 2007/0247414 A1* | 10/2007 | Roberts ............... 345/102 |

* cited by examiner

*Primary Examiner*—Ismael Negron
*Assistant Examiner*—Danielle Dunn
(74) *Attorney, Agent, or Firm*—Brinks Hofer Gilson & Lione

(57) ABSTRACT

A backlight unit suitable to prevent color separation phenomenon of LED lamps is disclosed. The backlight unit includes a bottom cover, a printed circuit board attached to an inner upper surface of the bottom cover, a plurality of LED lamps mounted on an upper surface of the printed circuit board to extend in a direction, and a reflecting plate having a plurality of holes to expose light emitting portions of the LED lamps, respectively, the holes having a tapered side section.

10 Claims, 10 Drawing Sheets

BACKLIGHT UNIT

This application claims the benefit of Korean Patent Application No. P2006-60529, filed on Jun. 30, 2006, which is hereby incorporated by reference as if fully set forth herein.

TECHNICAL FIELD

The present application relates to a backlight unit, and more particularly, to a backlight unit suitable for preventing a color separation phenomenon of an LED lamp.

BACKGROUND

Cathode ray tubes (CRTs) are one of generally used display devices and have been mainly used in monitors of measuring instruments, information terminals, as well as in televisions. However, the CRTs are heavy and bulky and thus, do not cope with requirements for smaller size and light weight electronic products.

Accordingly, the CRTs have limits in size, weight, and other characteristics and are problematic to follow the tendency of the ongoing of the size and weight of a variety of electronic products. To substitute for the CRTs, there have been developed liquid crystal display (LCD) devices using electric-field optical effect, plasma display panels (PDPs) using gas discharge, electroluminescence display (ELD) devices using electric-field emission effect, and the like.

Liquid crystal display devices have advantages of small size, light weight, and low consumption of electric power, etc. required to substitute for the CRTs. Recently, the liquid crystal display devices have been developed to perform the role of flat panel display devices, and used in laptop computers as well as monitors of desktop computers, and other large-scale information display devices. The demand for liquid crystal display devices is increasing continuously.

Such a liquid crystal display device may be basically divided into a liquid crystal panel for displaying images thereon and a drive unit for applying a driving signal to the liquid crystal panel. The liquid crystal panel includes first and second glass substrates bonded to each other with a predetermined space therebetween, and a liquid crystal layer injected between the first and second glass substrates.

Specifically, the first glass substrate (TFT array substrate) is formed with a plurality of gate lines arranged in a direction to be spaced apart from each other by a predetermined distance, a plurality of data lines arranged orthogonal to the respective gate lines to be spaced apart from each other by a predetermined distance, a plurality of pixel electrodes formed at respective pixel regions where the gate lines and data lines intersect with each other, the pixel electrodes defining a matrix, and a plurality of thin-film transistors adapted to be switched by signals from the gate lines, so as to transmit signals from the data lines to the respective pixel electrodes.

The second glass substrate (color filter substrate) is formed with a black matrix layer for shielding light at a portion except for the pixel regions, red (R), green (G), and blue (B) color filter layers for representing a variety of colors, and a common electrode for realizing images.

The first and second glass substrates are bonded to each other by means of a sealing material pattern having a liquid crystal injection port in such a manner that they have a predetermined separation through the use of a spacer. Liquid crystals are injected into the space between the substrates.

Most liquid crystal display devices are light-receiving devices and adapted to display images by regulating the amount of light incident from the outside passing therethrough. Therefore, the liquid crystal display devices need a separate light source for irradiating light to a liquid crystal panel, such as a backlight unit. The backlight unit as a separate light source is may be an edge type backlight unit or a direct type backlight unit, based on the installation positions of lamp units.

Examples of the light source for the liquid crystal display devices include electro luminescence (EL), light emitting diode (LED), cold cathode fluorescent lamp (CCFL), hot cathode fluorescent lamp (HCFL), external electrode fluorescent lamp (EEFL), and the like.

The CCFL, HCFL, and EFFL are linear light sources, and an LED is a point light source.

The backlight unit has been used to assist a user to read information displayed on a screen of a liquid crystal display device in a dark place, and in response to a variety of requirements, low consumption of electric power, overall thinness, a reduced thickness light guide plate of the backlight unit and the like. Backlight units are being developed to have a function of representing a variety of colors and to achieve a reduction in the consumption of electric power through the use of LEDs.

A light emitting diode (LED) is a solid state device using photoelectric transformation effect of semiconductors, and adapted to emit light when a forward voltage is applied thereto. The LED is able to emit light at a lower voltage than tungsten filament lamps and, more particularly, to emit light based on a difference of energy that is generated during an electron-hole recombination, rather than emitting light via heating of filaments. Therefore, the LED has been widely used in a variety of display devices.

Using the LED as a light source for illuminating a liquid crystal panel is efficient to provide electronic appliances, such as laptop computers, etc., with outstanding characteristics, such as smaller size and low consumption of electric power.

Since the LED can emit light if a low voltage DC power is applied thereto, it has no necessity for a DA-AC converter. Consequently, the LED has a feature of a simplified driving unit, thus achieving a considerable reduction in the consumption of electric power.

Also, the LED is a semiconductor device and therefore, has a higher reliability, smaller size, and longer lifespan than cathode ray tubes.

Figure 1:
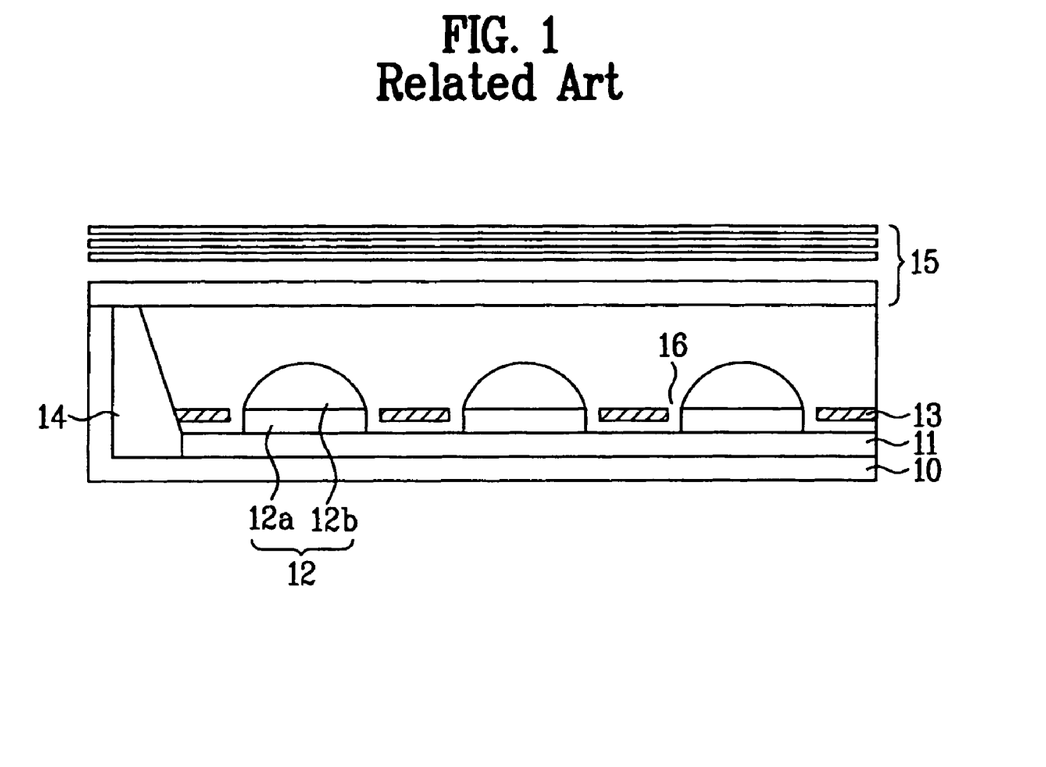
FIG. 1 is a sectional view illustrating the configuration of a conventional backlight unit.
Figure 2:
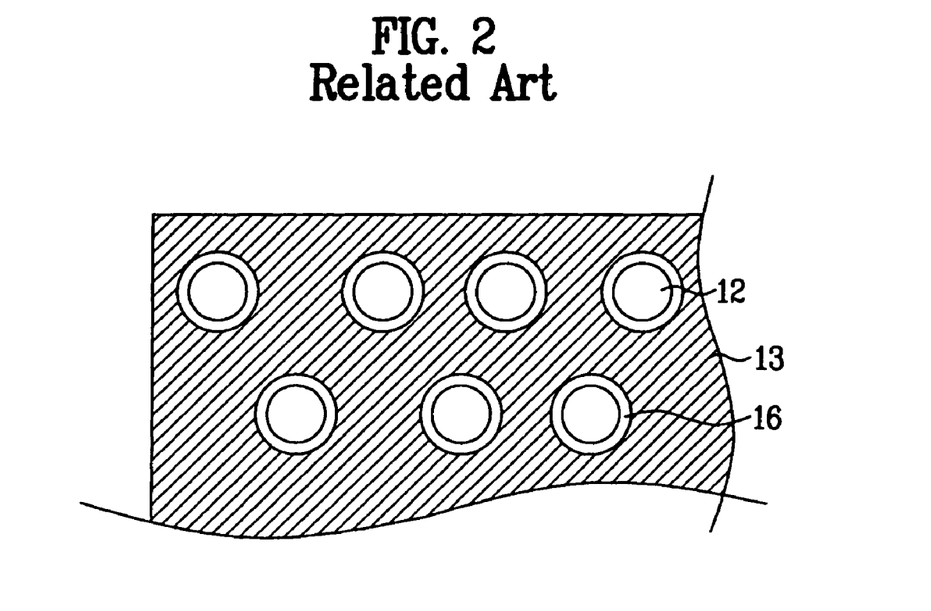
FIG. 2 is a sectional view illustrating the configuration of a reflecting plate and LED lamp of FIG. 1.

A conventional backlight unit, as shown in FIGS. 1 and 2, includes a bottom cover 10, a printed circuit board (PCB) 11 attached to an inner upper surface of the bottom cover, a plurality of LED lamps 12 successively mounted on an upper surface of the printed circuit board 11 to extend in a direction, and a reflecting plate 13 disposed over the printed circuit board 11 and adapted to transmit light generated from the LED lamps 12 upward.

Side supporters 14 are provided at opposite sides of the printed circuit board 11, to support the printed circuit board 11. A light diffusion unit 15 is disposed over the arranged LED lamps 12. In this case, the light diffusion unit 15 includes a diffusion plate and a plurality of optical sheets.

Figure 3A:
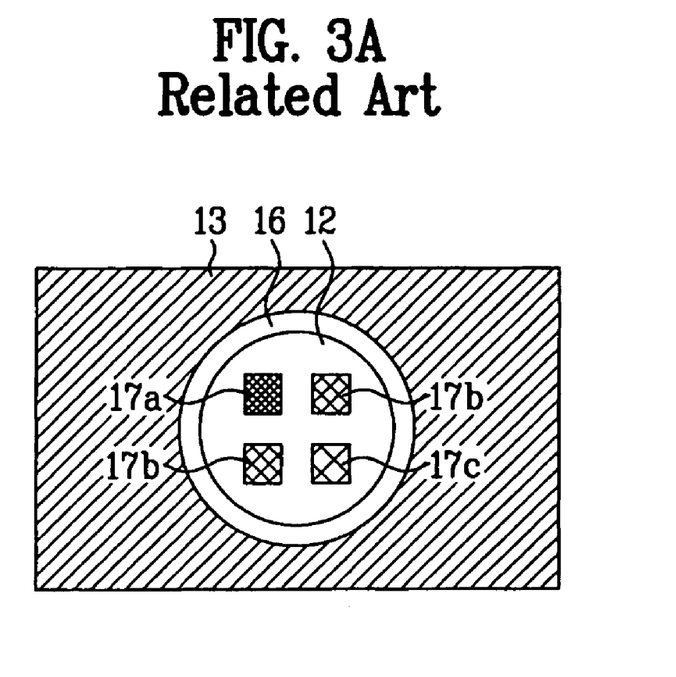
FIGS. 3A and 3B are a plan view and a sectional view, respectively, illustrating a unit LED lamp.
Figure 3B:
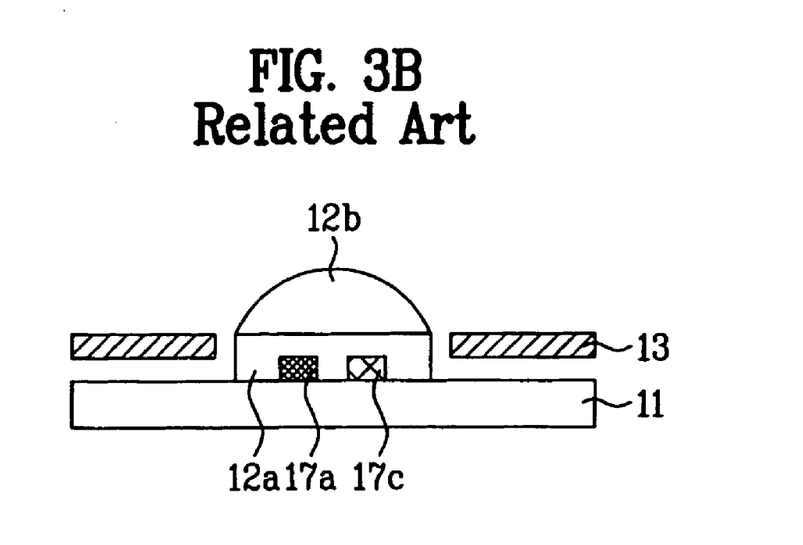

Each of the LED lamps 12, as shown in FIGS. 3A and 3B, includes a combination of red (R), green (G), and blue (B) LED chips 17a, 17b, and 17c. Since all the LED lamps 12 have the same configuration as each other, the following description deals with only one LED lamp 12. In the shown conventional example, more particularly, two green LED chips 17b are arranged diagonally to each other, and one red LED chip 17a and one blue LED chip 17c are arranged diagonally to each other so that each is on an opposite side of its horizontally adjacent green LED chip 17b compared to the other.

The LED lamp 12 is divided into a lower body portion 12a and an upper light emitting portion 12b. The reflecting plate 13 has a plurality of holes 16 formed at positions thereof corresponding to the light emitting portions 12b of the LED lamps 12, respectively, such that the reflecting plate 13 is fitted at a boundary region between the body portion 12a and the light emitting portion 12b of the respective LED lamps 12. In this case, the light emitting portions 12b of the LED lamps 12 have dome-shaped optical lenses.

The holes 16 are vertically formed in the reflecting plate by a simple punching process.

If light is emitted from the LED lamp 12 including the red, green, and blue chips 17a, 17b, and 17c, the light is reflected by the light diffusion unit 15 or side supporters 14. The reflecting plate 13 having the above described configuration serves to again reflect the light, so as to emit the reflected light to the outside from an upper surface of the backlight unit.

However, the respective red, green, and blue LED chips 17a, 17b, and 17c included in the LED lamp 12 are arranged in such a manner that they are slightly deflected from the center of the LED lamp 12. With this deflected chip arrangement, the light emitting portion, i.e. optical lens, emits a slightly greater amount of light in a direction close to an edge thereof. Also, a laterally emitted part of the light emitted from the light emitting portion 12b formed by the optical lens collides with a vertical section of each hole 16 formed in the reflecting plate 13, thereby being bent toward a diagonal edge portion and reflected upward.

Figure 4A:
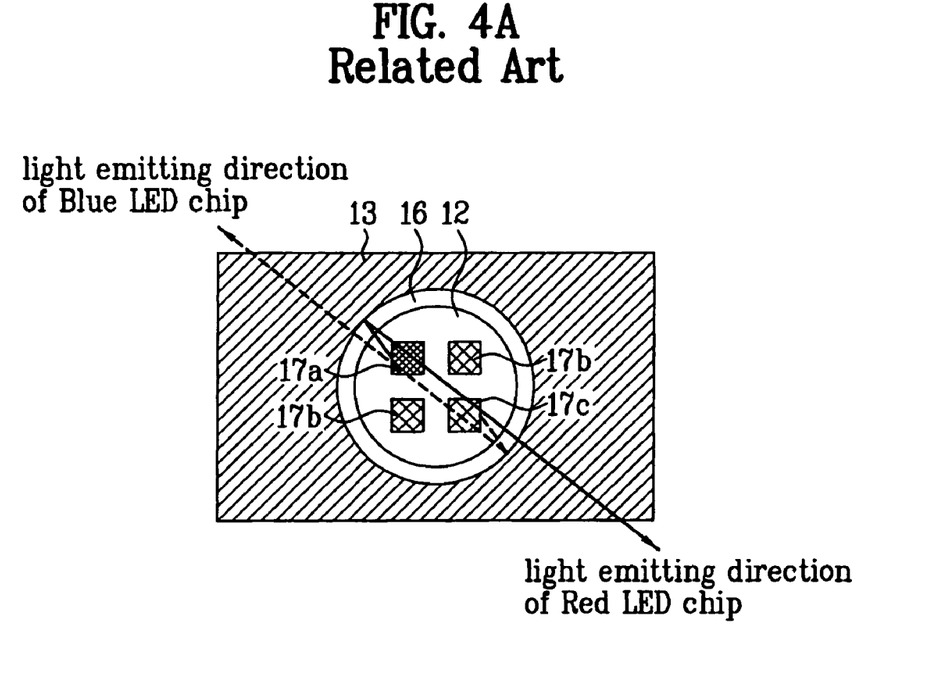
FIGS. 4A and 4B are a plan view and a sectional view, respectively, illustrating color separation mechanism based on the emission of light from a unit LED lamp.
Figure 4B:
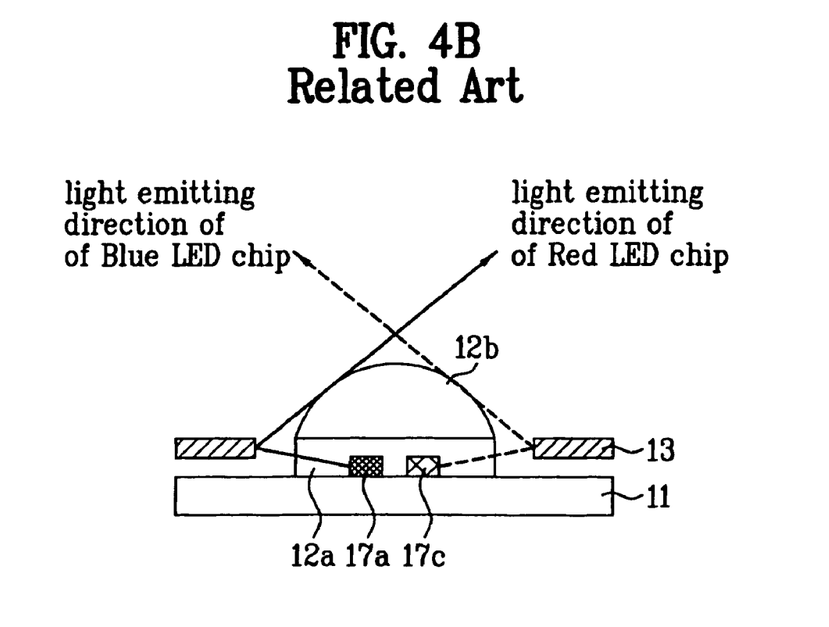
Figure 5:
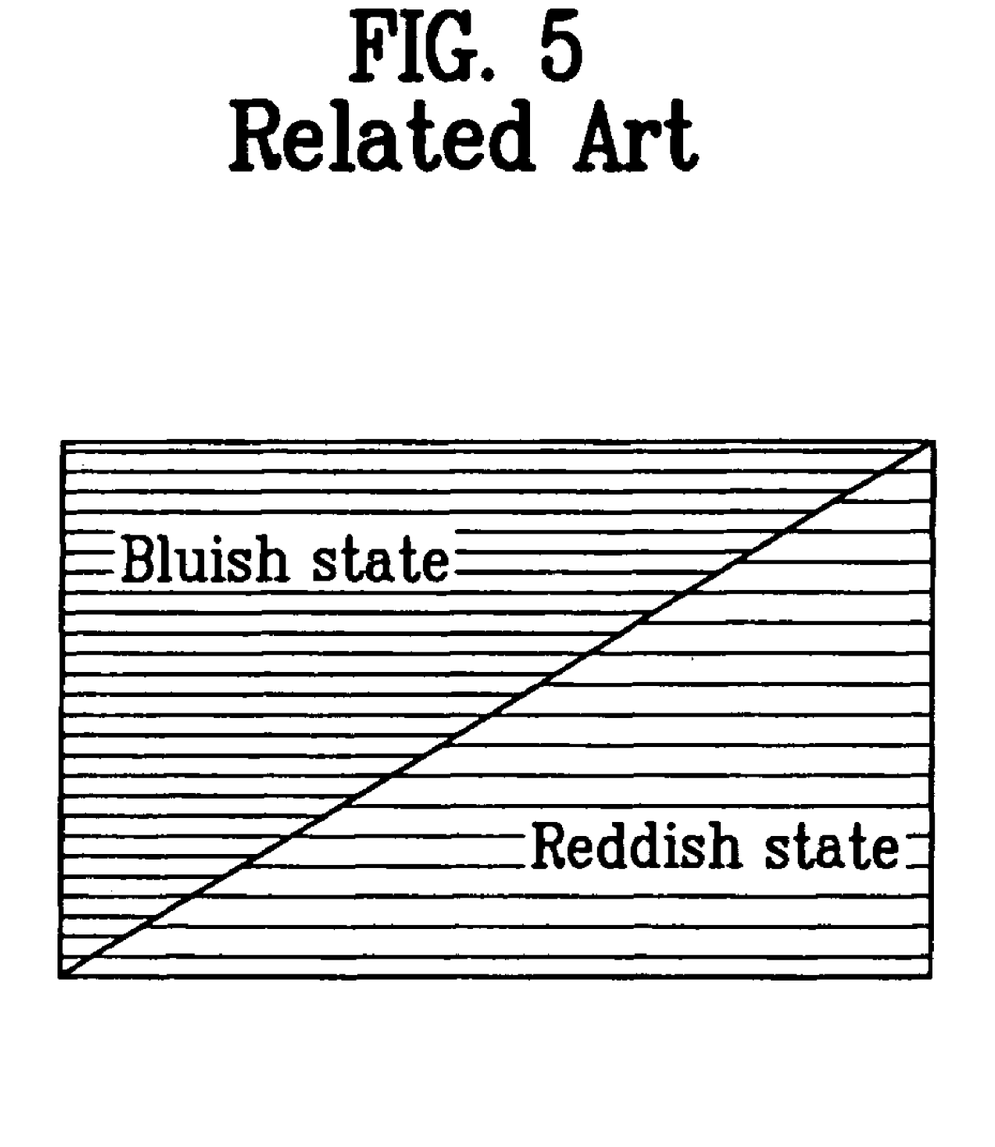
FIG. 5 is an exemplary view illustrating color separation phenomenon of an LED lamp.

In this case, since the holes 16 are formed vertically in the reflecting plate 13 by a simple punching process, as shown in FIGS. 4A, 4B, and 5, the light transmitted to the vertical section of each hole 16 is bent and reflected in a direction opposite to the associated LED chip. As a result, the LED lamp 12 shows color separation phenomenon in that a diagonal portion of the LED lamp 12 where the red LED chip 17a is located represents a reddish color, and an opposite diagonal portion where the blue LED chip 17c is located represents a bluish color.

Since the holes 16, which are used to expose the light emitting portions 12b of the LED lamps 12 to the outside, are punched vertically in the reflecting plate 13, the light emitted from the respective LED chips is directed in a diagonal direction after colliding with the vertical section of each hole 16. This causes a color separation phenomenon between opposite diagonal portions of the respective LED chips.

SUMMARY

A backlight unit is described, including: a bottom cover; a printed circuit board attached to an inner upper surface of the bottom cover; a plurality of LED lamps which are mounted on an upper surface of the printed circuit board to extend in a direction; and a reflecting plate which is formed on the PCB, an having a plurality of holes or apertures used to expose light emitting portions of the LED lamps, respectively, each of the holes having a tapered side section.

The holes of the reflecting plate may be tapered in such a manner that a width thereof increases toward an upper portion thereof.

The holes of the reflecting plate may be configured in such a manner that a tapering angle thereof is in a range of approximately 5°~80° with respect to a vertical axis.

The tapered side section of the holes formed in the reflecting plate may have a linear, convex, concave, or indented shape.

The holes of the reflecting plate may be larger than the light emitting portions of the LED lamps.

The holes of the reflecting plate may have a shape selected from among a circular shape and other various polygonal shapes including a triangle, square, pentagon, and hexagon, and higher order polygons.

The backlight unit may further include side supporters provided at opposite sides of the printed circuit board, on which the LED lamps are arranged, and adapted to support the printed circuit board.

The backlight unit may further include a light diffusion unit disposed above the LED lamps, the light diffusion unit including a light diffusion plate and a plurality of optical sheets.

Each of the LED lamps may include a combination, for example, of one red LED chip, two green LED chips, and one blue LED chip.

The LED chips of the LED lamp may be arranged in such a manner that the two green LED chips may be arranged diagonally to each other and the red and blue LED chips may be arranged diagonally, so as to be disposed horizontally adjacent to green LED chips, respectively.

Each of the LED lamps may be divided into a body portion and the light emitting portion, and the reflecting plate may be fitted at approximately a boundary region between the body portion and the light emitting portion of each LED lamp.

The light emitting portion of each LED lamp may be formed by a dome-shaped optical lens.

BRIEF DESCRIPTION OF THE DRAWINGS

The accompanying drawings, which are included to provide a further understanding of the invention and are incorporated in and constitute a part of this application, illustrate embodiment(s) of the invention In the drawings.

DETAILED DESCRIPTION

Reference will now be made in detail to examples which are illustrated in the accompanying drawings. Wherever possible, the same reference numbers will be used throughout the drawings to refer to the same or like parts.

Figure 6:
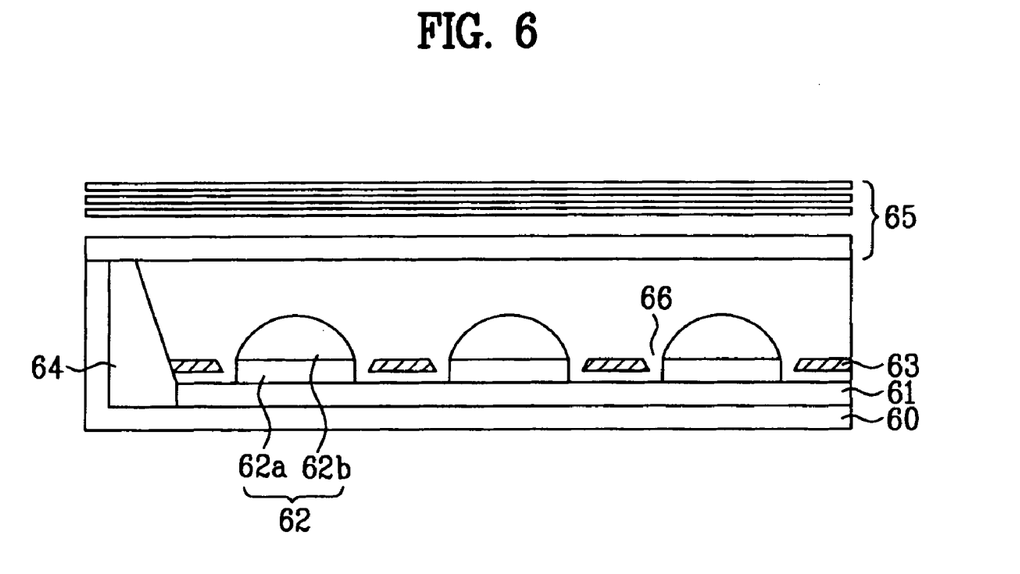
FIG. 6 is a sectional view illustrating the configuration of a backlight unit according to an embodiment.
Figure 7A:
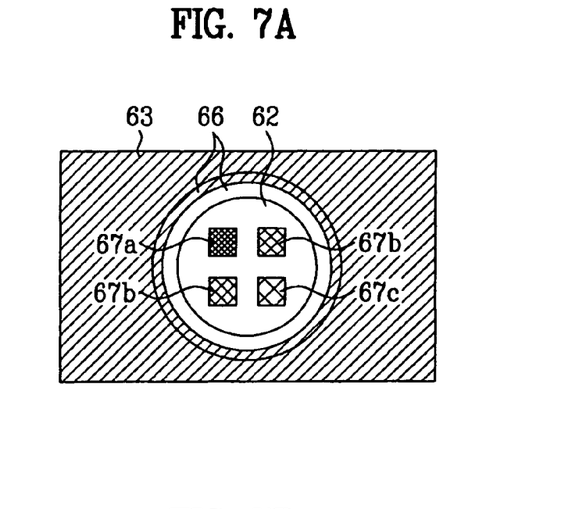
FIGS. 7A and 7B are a plan view and a sectional view, respectively, illustrating a unit LED lamp.
Figure 7B:
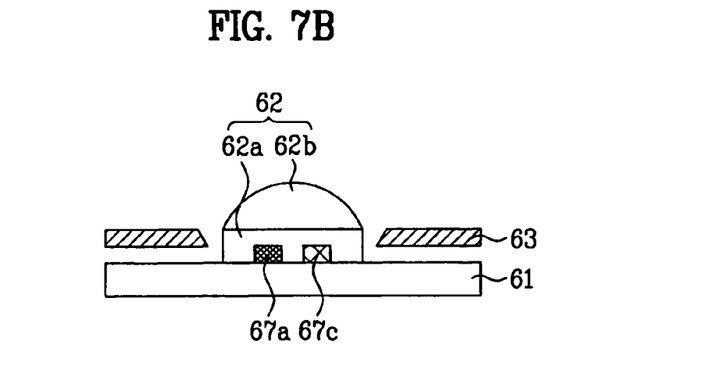

FIG. 6 is a sectional view illustrating the configuration of a backlight unit. FIGS. 7A and 7B are a plan view and a sectional view, respectively, illustrating a unit LED lamp.

Figure 8:
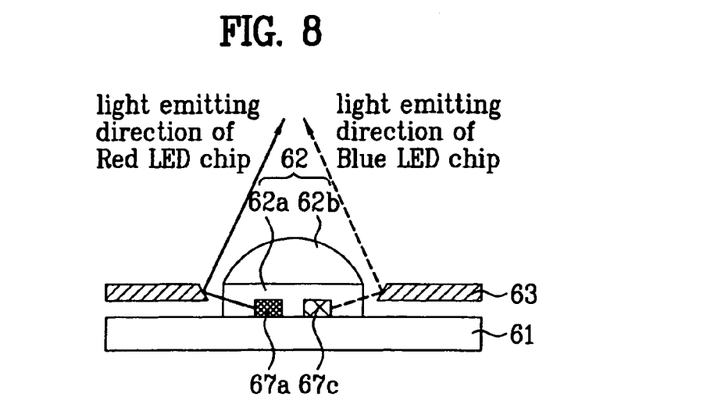
FIG. 8 is view illustrating a light emitting direction of a backlight unit according to the embodiment of FIG. 6.

FIG. 8 is a view illustrating a light emitting direction of a backlight unit.

FIGS. 9A to 9D are views illustrating different tapering configurations of holes formed in a reflecting plate. FIGS. 10A to 10E are plan views illustrating different sectional shapes of holes formed in a reflecting plate according to the embodiment of the present invention.

The backlight unit shown in FIG. 6, includes a bottom cover 60, a printed circuit board (PCB) 61 attached to an inner upper surface of the bottom cover 60, a plurality of LED lamps 62 successively mounted on an upper surface of the printed circuit board 61 to extend in a direction, and a reflecting plate 63 disposed over the printed circuit board 61 and adapted to transmit light generated from the LED lamps 62 upward.

Side supports 64 are provided at opposite sides of the printed circuit board 61, on which the LED lamps 62 are arranged, to support the printed circuit board 61. A light diffusion unit 65 is disposed over the arranged LED lamps 62. In this case, the light diffusion unit 65 may include a diffusion plate and a plurality of optical sheets.

Although not shown in the drawings, the printed circuit board 61, on which the LED lamps 62 are arranged in a direction, has a drive circuit for driving the LED lamps.

Each of the LED lamps 62, as shown in FIGS. 7A and 7B, includes a combination of red (R), green (G), and blue (B) LED chips 67a, 67b, and 67c. The LED lamps 62 may each have and the following description deals with only one LED lamp 62. In this example, two green LED chips 67b are arranged diagonally to each other, and one red LED chip 67a and one blue LED chip 67c are also arranged diagonally to each other so that each is disposed horizontally with respect to an adjacent green LED chip. The arrangement of the LED chips included in each LED lamp having the above described configuration is given for the purpose of example, and other combinations of color chips and arrangements thereof are equally possible.

The LED lamp 62 is divided into a lower body portion 62a and an upper light emitting portion 62b. The reflecting plate 63 has a plurality of holes 66 formed at positions thereof corresponding to the light emitting portions 62b of the LED lamps 62, respectively, such that the reflecting plate 63 is disposed approximately at a boundary region between the body portion 62a and the light emitting portion 62b of the respective LED lamps 62. In this case, the light emitting portions 62b of the LED lamps 62 are have dome-shaped optical lenses.

The holes 66 of the reflecting plate 63 are tapered in such a manner that a width of each hole 66 increases toward an upper portion thereof.

When light is emitted from the LED lamp 62 including the red, green, and blue chips 67a, 67b, and 67c, the light is reflected by the light diffusion unit 65 or side supporters 64. The reflecting plate 63 having the above described configuration serves to again reflect the light, so as to emit the reflected light to the outside from an upper surface of the backlight unit.

The respective red, green, and blue LED chips 67a, 67b, and 67c included in the LED lamp 62 are arranged in such a manner that they are slightly displaced from the center of the LED lamp 62. With this chip arrangement, the light emitting portion 62b formed by the optical lens emits a slightly greater amount of light in a direction close to an edge thereof.

Also, a laterally emitted part of the light emitted from the light emitting portion 62b formed by the optical lens illuminates a vertical section of each hole 66 formed in the reflecting plate 63, and may be reflected toward an upper convergence position.

When a part of the light emitted from the LED lamp 62 illuminates a side of each hole or aperture 66 formed in the reflecting plate 63 to be reflected upward, as shown in FIG. 8, each hole 66 is tapered such that the light may be emitted toward an upper position on a center vertical axis of the associated LED lamp 62.

By regulating a tapering angle (i.e. inclination angle) of the holes 66 formed in the reflecting plate 63, a reflecting direction of the light emitted from the light emitting portions 62b (optical lenses) of the LED lamps can be controlled.

As a result of emitting the light to an upper position on the center axis of the respective LED lamps 62 by regulating the tapering angle of the holes 66 formed in the reflecting plate 63, the present invention may have the effect of preventing color separation phenomenon of the LED lamps 62, and achieving an increase in brightness.

Figure 9A:
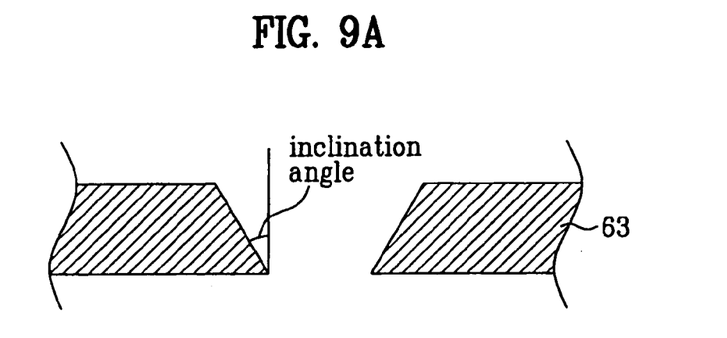
FIGS. 9A to 9D are views illustrating different tapering configurations of holes formed in a reflecting plate.
Figure 9B:
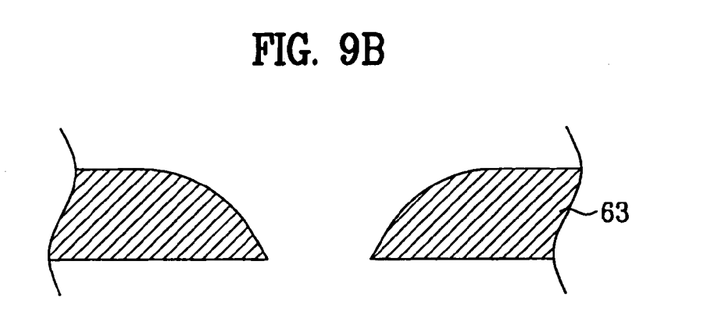
Figure 9C:
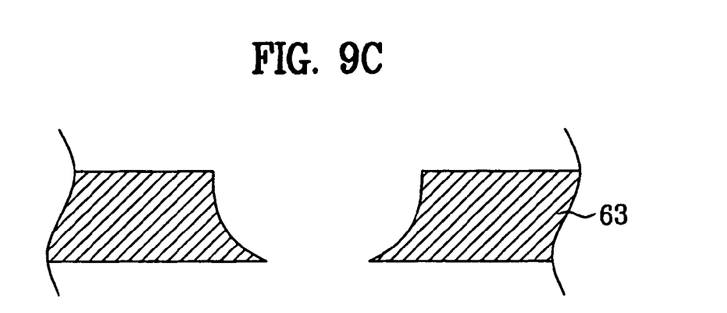
Figure 9D:
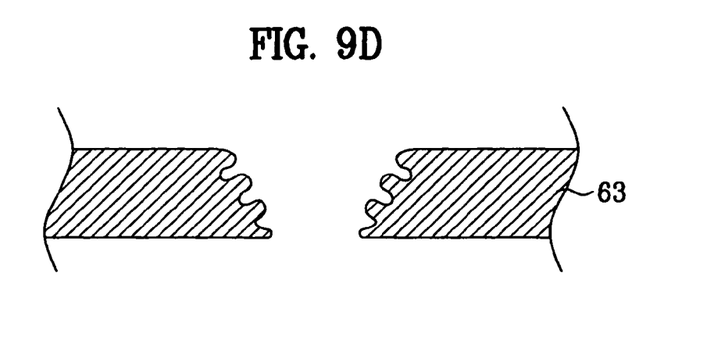
Figure 10A:
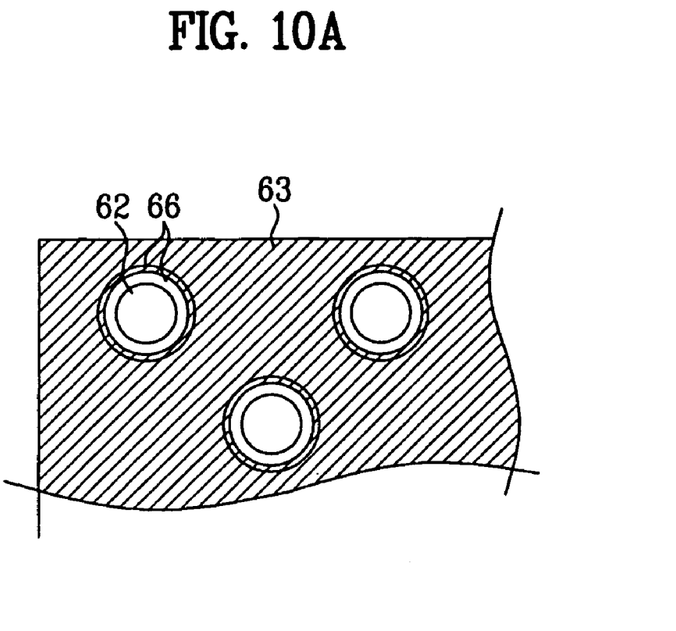
FIGS. 10A to 10E are plan views illustrating different sectional shapes of holes formed in a reflecting plate.
Figure 10B:
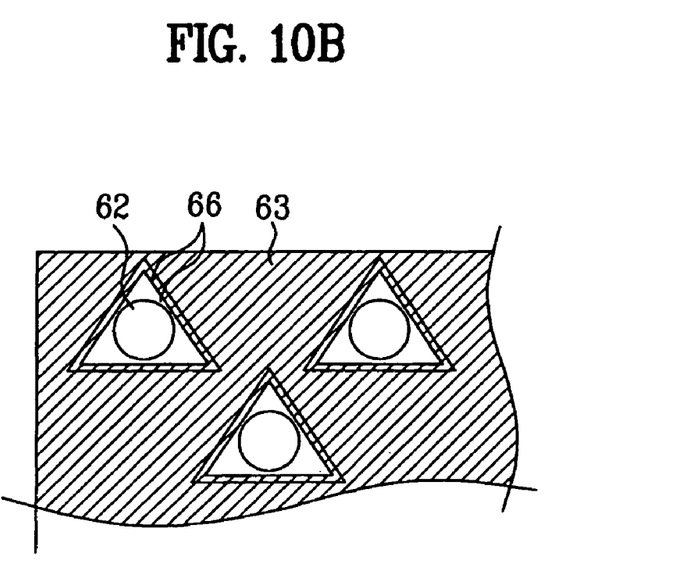
Figure 10C:
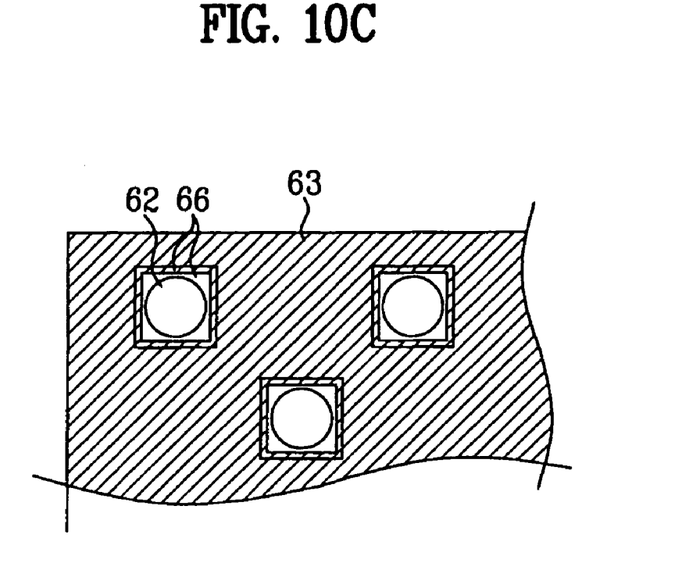
Figure 10D:
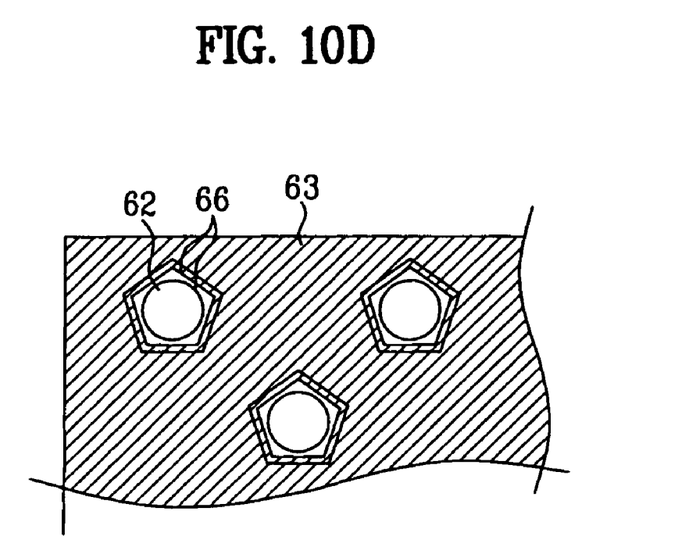
Figure 10E:
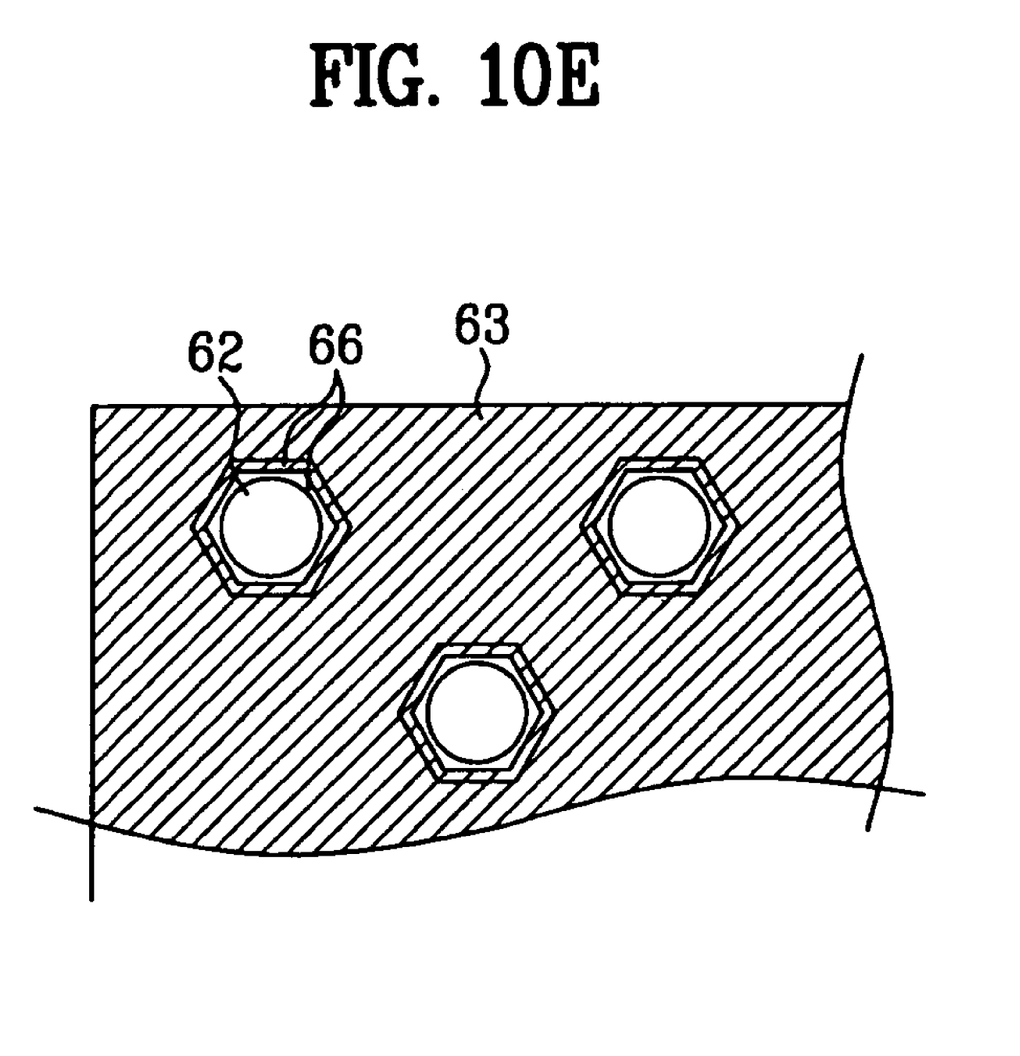

The holes 66 of the reflecting plate 63 are tapered in such a manner that a width thereof increases toward an upper portion thereof. The tapered holes 66 may have a linear, convex, or concave side sectional shape as shown in FIGS. 9A, 9B, and 9C, or may have an indented side sectional shape as shown in FIG. 9D, or the like.

In this case, the tapering angle of each hole 66 formed in the reflecting plate 63 is in a range of being exceed 0° and less than 80° with respect to a vertical axis.

The holes 66 of the reflecting plate 63 may be larger than the optical lenses constituting the light emitting portions 62b of the LED lamps 62. The holes 66, as shown in FIGS. 10A, 10B, 10C, 10D, and 10E, may have a circular shape, or may have a variety of polygonal shapes, such as for example, triangle, square, pentagon, and hexagon or the like.

The backlight unit may be used as a light source to be mounted in front of or behind a display product, such as a monitor, notebook computer, television, or the like.

The holes, which are formed in a reflecting plate to expose light emitting portions of LED lamps to the outside, have a tapered shape. This may have the effect of preventing color separation phenomenon of the LED lamps.

The tapered holes, formed in the reflecting plate to expose the light emitting portions of the LED lamps, can reflect light, emitted laterally from the light emitting portions, i.e. optical lenses, of the LED lamps, toward an upper position on a center axis of the respective LED lamps which may results in an increase in the brightness of the backlight unit.

It will be apparent to those skilled in the art that various modifications and variations can be made in the present invention without departing from the spirit or scope thereof. Thus, it is intended that the present invention covers the modifications and variations of this invention provided they come within the scope of the appended claims and their equivalents.

What is claimed is:

1. A backlight unit comprising:
   a bottom cover;
   a printed circuit board attached to an inner surface of the bottom cover;
   a plurality of LED lamps mounted on an upper surface of the printed circuit board to extend in a direction; and
   a reflecting plate disposed on the printed circuit board and having a plurality of apertures, each aperture having a tapered side portion, wherein the plurality of apertures exposes light emitting portions of the LED lamps, wherein the tapered side section of the apertures formed in the reflecting plate has a convex shape, and the apertures of the reflecting plate have a polygonal shape including a triangle, square, pentagon, or hexagon.

2. The backlight unit according to claim 1, wherein the apertures of the reflecting plate are tapered in such that a width of the aperture increases in a direction away from the printed circuit board.

3. The backlight unit according to claim 1, wherein the apertures of the reflecting plate are configured in such a manner that a tapering angle thereof is in a range between 0° and 80° with respect to a vertical axis.

4. The backlight unit according to claim 1, wherein the apertures of the reflecting plate are larger than the light emitting portions of the LED lamps.

5. The backlight unit according to claim 1, further comprising:
   side supporters provided at opposite sides of the printed circuit board, and adapted to support the printed circuit board.

6. The backlight unit according to claim 1, further comprising:
   a light diffusion unit disposed above the LED lamps, the light diffusion unit comprising a light diffusion plate and a plurality of optical sheets.

7. The backlight unit according to claim 1, wherein each of the LED lamps comprises one red LED chip, two green LED chips, and one blue LED chip.

8. The backlight unit according to claim 7, wherein the LED chips of the LED lamp are disposed such that the two green LED chips are arranged diagonally to each other and the red and blue LED chips are arranged diagonally each adjacent to one of the green LED chips.

9. The backlight unit according to claim 1, wherein each of the LED lamps is divided into a body portion and the light emitting portion, and the reflecting plate is fitted at approximately a boundary region between the body portion and the light emitting portion of each LED lamp.

10. The backlight unit according to claim 9, wherein the light emitting portion of each LED lamp has a dome-shaped optical lens.

\* \* \* \* \*